(12) United States Patent
Delgado

(10) Patent No.: US 10,457,448 B2
(45) Date of Patent: Oct. 29, 2019

(54) MULTILAYER ALUMINUM CAPSULE

(71) Applicant: RAMONDIN CAPSULAS, S.A., Laguardia (Araba/Álava) (ES)

(72) Inventor: Miguel Ángel González Delgado, Laguardia (ES)

(73) Assignee: Ramondin Capsulas, S.A., Laguardia (Araba/Álava) (ES)

( * ) Notice: Subject to any disclaimer, the term of this patent is extended or adjusted under 35 U.S.C. 154(b) by 0 days.

(21) Appl. No.: 15/853,317

(22) Filed: Dec. 22, 2017

(65) Prior Publication Data

US 2018/0178951 A1   Jun. 28, 2018

(30) Foreign Application Priority Data

Dec. 22, 2016   (EP) .................................. 16382642

(51) Int. Cl.
| | | |
|---|---|---|
| *B65D 41/62* | (2006.01) | |
| *B32B 15/20* | (2006.01) | |
| *B21D 51/48* | (2006.01) | |
| *B67B 5/03* | (2006.01) | |
| *B32B 15/12* | (2006.01) | |
| *B32B 38/12* | (2006.01) | |

(52) U.S. Cl.
CPC ............. *B65D 41/62* (2013.01); *B21D 51/48* (2013.01); *B32B 15/12* (2013.01); *B67B 5/03* (2013.01); *B32B 38/12* (2013.01)

(58) Field of Classification Search
CPC ...... B65D 1/0215; B65D 1/0207; B65D 1/02; B65D 1/40; B65D 23/02; B65D 41/04; B21D 51/48; B21D 51/50
USPC ............. 215/12.1, 326, 328, 324; 220/62.17, 220/62.12, 62.11, DIG. 11; 428/472.2, 428/650, 615; 72/379.4; 413/23, 24, 18, 413/8
See application file for complete search history.

(56) References Cited

U.S. PATENT DOCUMENTS

| | | | | |
|---|---|---|---|---|
| 1,215,737 A | * | 2/1917 | Stahl ...................... | B65D 41/12 215/328 |
| 1,351,438 A | * | 8/1920 | Pease ..................... | B65D 41/14 215/326 |
| 1,832,669 A | * | 11/1931 | Thomas .................. | B65D 41/20 215/332 |
| 2,586,446 A | * | 2/1952 | Stockburger ........... | B65D 41/14 156/183 |
| 3,551,235 A | * | 12/1970 | Bassemir ................ | B32B 27/00 156/322 |
| 4,257,549 A | * | 3/1981 | Bricmont .............. | B32B 15/012 228/235.2 |
| 4,801,041 A | * | 1/1989 | Takata .................... | B29C 65/18 220/260 |
| 5,139,889 A | * | 8/1992 | Imazu ................... | B21D 22/201 220/62.11 |
| 5,172,460 A | | 12/1992 | Womack | |
| 5,779,073 A | * | 7/1998 | Milhomme ............ | B65D 41/62 215/232 |
| 2013/0206755 A1 | * | 8/2013 | Myerscough ......... | B29C 51/266 220/62.11 |

FOREIGN PATENT DOCUMENTS

| | | | |
|---|---|---|---|
| EP | 0 475 856 A1 | 3/1992 | |
| ES | 2 043 075 T3 | 12/1993 | |
| FR | 2572331 A1 * | 5/1986 | ............. B29C 51/14 |
| FR | 2 825 687 A1 | 12/2002 | |

OTHER PUBLICATIONS

Translation of FR 2572331, Debard, May 2, 1986, p. 3. (Year: 1986).*
Extended European Search Report received in Application No. 16382642.3 dated Apr. 18, 2017.

\* cited by examiner

*Primary Examiner* — Robert J Hicks
(74) *Attorney, Agent, or Firm* — Knobbe, Martens, Olson & Bear, LLP

(57) ABSTRACT

A multilayer capsule of the types which cover the neck of wine or liquor bottles is made is made exclusively of aluminum, or at least 98% by weight of aluminum. A production method for preparing the capsule can include forming a capsule body and fixing an aluminum disc in the upper part of the body. Another production method can include cutting a multilayer sheet into suitable size for the capsule; and forming the capsule by deep-drawing.

7 Claims, No Drawings

MULTILAYER ALUMINUM CAPSULE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to and the benefit of European Patent Application No. 16382642.3 filed in the European Patent Office on Dec. 22, 2016, the entire contents of which are incorporated herein by reference.

BACKGROUND

Field

The present invention relates to a capsule of the types which cover the neck of wine or liquor bottles and to the production method for producing said capsule.

Description of Related Art

It is common to use capsules for covering the neck of bottles. The capsule protects the cork from dust in addition to being an indication to assure that the bottle has not been opened.

Usually, capsules of this type are made of tin, aluminum or in the case of more complex capsules, the capsules are formed with different materials, such as capsules which have a polyethylene core and two outer aluminum layers, for example.

Tin capsules are the most expensive due both to the cost of the raw material and to the method of manufacturing capsules of this type which are performed by means of deep-drawing. In the case of deep-drawn aluminum capsules, the raw material is more cost-effective than tin but the method can be very complex because, since they are less malleable than tin, there is an annealing step after the deep-drawing step.

Due to the characteristics of aluminum and capsule thickness, in the case of capsules produced with said material, a sharp burr may be formed when the capsule is removed to open the bottle.

One example of aluminum capsule is described in the patent with publication number ES2043075 describing an overcapping aluminum capsule having a line of weakness to make opening easier.

Capsules with a polyethylene core and two outer aluminum layers cannot be recycled since the different sheets cannot be separated. To recycle the aluminum, the capsules are burned such that toxic gases are generated as polyethylene melts.

Based on what is known in the state of the art, it would be extremely useful to develop a completely recyclable capsule which has a simple production method, is readily malleable to be coupled to the neck of the bottle, has reduced cost and does not form sharp burrs when being removed from the bottle.

SUMMARY

The present invention relates to capsules made of aluminum layers of the types that cover the neck of bottles once the stopper is placed in the neck. The present invention also relates to the production method for producing the capsule and to the bottle comprising said capsule.

The new capsule of the invention is made only of aluminum but as a result of the method with which it is produced, it has a lower price than capsules known in the state of the art produced by deep-drawing. The capsule of the invention can be recycled as it is made entirely of aluminum. Another feature of the capsule of the invention is that is highly malleable because it is made of aluminum layers having a thickness comprised between 4 microns and 50 microns. Sharp burrs are not formed when the capsule is removed from the bottle as a result of the defined layer thickness. Furthermore, the capsules of the invention can have smaller capsule thicknesses than the capsules of the state of the art.

The capsule of the present invention is characterized in that it comprises at least two aluminum layers, where each of the layers has a thickness comprised between 4 microns and 50 microns, where the layers are made of aluminum.

The production method for producing the capsule starts by attaching the desired aluminum layers together to produce a sheet of specific thickness which, however, will have better malleability and handling characteristics than a sheet of the same thickness formed with a single layer. Once the sheet is produced, it is cut into suitable size to produce the intended capsule. One of the ends thereof is glued such that it is fixed at the opposite ends once folded. Finally, a disc will be fixed in the upper part.

Therefore, the production method for producing said capsule comprises the steps of:

a) adhering together at least two aluminum layers with a thickness comprised between 4 microns and 50 microns to produce a multilayer aluminum sheet;

b) cutting the multilayer sheet into suitable size to form the capsule body;

c) putting glue on one of the edges of the cut sheet;

d) forming the capsule body by folding and sticking the opposite edges together;

e) fixing an aluminum disc in the upper part of the body formed in step d).

The capsule can be produced from the multilayer aluminum sheet through an annealing-free deep-drawing method. It is possible to avoid the annealing step because the sheet is produced from layers having a very small thickness. The method is therefore simplified and the cost thereof reduced.

Therefore, another aspect of the invention relates to a production method for producing a multilayer aluminum capsule comprising the steps of:

a) adhering together at least two aluminum layers with a thickness comprised between 4 microns and 50 microns to produce a multilayer aluminum sheet;

b) cutting the multilayer sheet into suitable size to form the capsule c) forming the capsule by deep-drawing.

Finally, another aspect of the invention relates to the bottle comprising the capsule of the invention. The capsule of the invention is located covering the neck of the bottle having a closure stopper.

DETAILED DESCRIPTION

As mentioned, the new capsule of the invention is made of aluminum. When reference is made to aluminum in the present invention, it refers to aluminum or to a metal alloy comprising at least 98% by weight of aluminum. Therefore, the capsule is preferably made of a metal alloy comprising at least 98% by weight of aluminum. More preferably, the capsule is a metal alloy comprising at least 99.5% by weight of aluminum.

As indicated above, the capsule of the present invention is characterized in that it comprises at least two aluminum layers, where each of the layers has a thickness comprised between 4 microns and 50 microns.

Preferably, the number of layers is selected from 2, 3, 4, 5, 6, 7, 8, 9, 10, 11, 12. More preferably, the number of layers is selected from 3, 4, 5, 6. Particularly, the number of layers is 4.

Preferably, the thickness of each of the aluminum layers is comprised between 10 microns and 20 microns. Particularly, the capsule consists of 4 aluminum layers, each of the layers being 20 microns.

As mentioned above, a method of the invention relates to a production method for producing an aluminum capsule comprising the steps of:
 a) adhering together at least two aluminum layers with a thickness comprised between 4 microns and 50 microns to produce a multilayer aluminum sheet;
 b) cutting the multilayer sheet into suitable size to form the capsule body;
 c) putting glue on one of the edges of the cut sheet;
 d) forming the capsule body by folding and sticking the opposite edges together:
 e) fixing an aluminum disc in the upper part of the body formed in step d).

Preferably, the aluminum disc of step e) is also made of the multilayer sheet produced in step a).

What is claimed is:

1. A multilayer aluminum capsule made only of aluminum to cover a neck of a bottle, comprising at least two aluminum layers, wherein each of the layers has a thickness between 4 microns and 50 microns, and wherein the capsule is formed by a body and a disc in the upper part of the body.

2. The aluminum capsule according to claim 1, wherein the number of layers is selected from the group consisting of 3, 4, 5, and 6.

3. The aluminum capsule according to claim 1, wherein the thickness of each of the layer is between 10 microns and 20 microns.

4. The aluminum capsule according to claim 1, wherein the capsule consists of 4 aluminum layers, each of the layers being about 20 microns in thickness.

5. A method for producing the capsule defined in claim 1, comprising:
 a) adhering together at least two aluminum layers with a thickness between 4 microns and 50 microns to produce a multilayer aluminum sheet;
 b) cutting the multilayer sheet into suitable size to form a capsule body;
 c) putting glue on one of the edges of the cut sheet;
 d) forming a capsule body by folding and sticking the opposite edges together;
 e) fixing an aluminum disc in the upper part of the body formed in step d); and
 f) coupling the malleable capsule in the neck of the bottle.

6. A method for producing the capsule defined in claim 1, comprising:
 a) adhering together at least two aluminum layers with a thickness between 4 microns and 50 microns to produce a multilayer aluminum sheet;
 b) cutting the multilayer sheet into suitable size for the capsule;
 c) forming the capsule by deep-drawing.

7. A bottle comprising the capsule defined in claim 1.

* * * * *